United States Patent [19]

Stetson et al.

[11] Patent Number: 5,279,649
[45] Date of Patent: Jan. 18, 1994

[54] COATING COMPOSITION AND METHOD OF FORMING

[75] Inventors: Alvin R. Stetson; William D. Brentnall; Zaher Z. Mutasim, all of San Diego; Lulu L. Hsu, LaJolla, all of Calif.

[73] Assignee: Solar Turbines Incorporated, San Diego, Calif.

[21] Appl. No.: 63,797

[22] Filed: May 20, 1993

Related U.S. Application Data

[63] Continuation-in-part of Ser. No. 891,098, Jun. 1, 1992.

[51] Int. Cl.$^5$ .......................... C09D 5/08; C22C 29/12
[52] U.S. Cl. ................................. 106/14.12; 106/1.12; 106/14.05; 106/14.21; 75/228; 75/230; 75/232; 75/235; 75/255; 148/22; 148/24; 148/26; 148/261; 148/262
[58] Field of Search ................ 106/1.12, 14.12, 14.21, 106/14.05; 75/228, 230, 232, 235, 255; 148/22, 24, 26, 261, 262

[56] References Cited

U.S. PATENT DOCUMENTS

| | | | |
|---|---|---|---|
| 3,248,249 | 4/1966 | Collins, Jr. | 106/286 |
| 3,248,251 | 4/1966 | Allen | 106/286 |
| 4,319,924 | 3/1982 | Collins, Jr. et al. | 106/14.12 |
| 4,537,632 | 8/1985 | Mosser | 106/14.12 |
| 4,617,056 | 10/1986 | Mosser et al. | 106/14.12 |
| 4,650,699 | 3/1987 | Mosser et al. | 427/240 |
| 4,659,613 | 4/1987 | Mosser et al. | 428/215 |
| 4,699,839 | 10/1987 | Hornberger | 428/312.8 |
| 4,724,172 | 2/1988 | Mosser et al. | 427/383.5 |
| 4,863,516 | 9/1989 | Mosser et al. | 106/14.12 |
| 4,889,558 | 12/1989 | Mosser | 106/14.12 |
| 5,066,540 | 11/1991 | Mosser et al. | 106/14.12 |

Primary Examiner—Anthony Green
Attorney, Agent, or Firm—Robert A. McFall

[57] ABSTRACT

A coating composition comprises a slurry consisting essentially of an aluminum neutralized phosphate bonding solution and aluminum powder. The bonding solution advantageously contains a relatively small but essential amount of vanadium pentoxide and, preferably, magnesium. A process for forming the bonding solution component of the coating slurry includes equilibrating an aqueous phosphate solution with a small but controlled and necessary amount of solute aluminum prior to adding aluminum powder to form the slurry. The present invention overcomes the problem of bonding solutions which require environmentally disadvantageous chromates or molybdates.

15 Claims, No Drawings

COATING COMPOSITION AND METHOD OF FORMING

This is a Continuation-In-Part of application Ser. No. 07/891,098, filed Jun. 1, 1992.

TECHNICAL FIELD

This invention relates generally to a corrosion and oxidation resistant coating composition and a method of forming said coating, and more particularly to a chromium and molybdenum free bonding solution component of the coating composition containing a relatively small but essential amount of vanadium pentoxide and a method for forming said composition.

BACKGROUND ART

Aluminum metal-phosphate coating compositions for protecting metallic surfaces from oxidation and corrosion, particularly at high temperatures, are well known in the art. For example, U.S. Pat. No. 3,248,251 issued Apr. 26, 1966 to Charlotte Allen teaches a coating composition containing chromium and/or molybdenum to inhibit the reaction between an aqueous, acidic, phosphate component of the composition and a solid particulate metallic material, preferably aluminum powder.

Heretofore, phosphate-aluminum powder coating compositions for protecting metallic surfaces from oxidation and corrosion have been based on an acid-base reaction to neutralize the bonding solution and contain either hexavalent chromium or molybdenum to inhibit the oxidation of metallic aluminum. Both hexavalent chromium and molybdenum are considered toxic chemicals and are therefore environmentally disadvantageous. In particular, hexavalent chromium is rated as a carcinogen. Molybdenum is classified as a toxic heavy metal.

The present invention is directed to overcoming the problems set forth above. It is desirable to have an oxidation and corrosion-resistant coating for metallic surfaces that does not require either chromates or molybdates to stabilize the reaction between the bonding solution and a particulate material component, e.g., powdered aluminum. Furthermore, it is desirable to have a bonding solution for such coatings that is free of both chromium and molybdenum.

DISCLOSURE OF THE INVENTION

In accordance with one aspect of the present invention, a coating composition comprises a mixture of a bonding solution and aluminum powder, in a ratio of about 100 ml of the bonding solution to from about 50 to about 150 g of the aluminum powder. The bonding solution consists essentially, by weight, of about 47% to about 80% $H_2O$, about 15% to about 35% $H_3PO_4$, less than about 20% of at least one magnesium compound, from about 0.1% to 3.0% $V_2O_5$, and aluminum in solution in an amount sufficient to substantially equilibrate said bonding solution with respect to aluminum.

In another aspect of the present invention, a method of forming a slurry coating, comprises mixing together about 500 to about 900 parts by weight water and about 150 parts by weight $H_3PO_4$ and forming a dilute phosphoric acid solution. Aluminum, either in its elemental form or as a compound, is added in an amount sufficient to substantially equilibrate the dilute phosphoric acid solution with respect to aluminum. Magnesium, either as a carbonate or oxide in an amount less than about 120 parts by weight, may also be added to the mixture. Vanadium pentoxide is added in an amount of from about 1 to about 30 parts by weight. The mixture is stirred, or agitated, for a period of time sufficient to permit completion of the reaction of the added compounds with phosphoric acid, and form a bonding solution that is substantially equilibrated with respect to aluminum. The equilibrated bonding solution is then mixed with aluminum powder to form a slurry containing from about 50 g to about 150 g of aluminum powder for each 100 ml of the neutralized bonding solution.

BEST MODE FOR CARRYING OUT THE INVENTION

In the preferred embodiment of the present invention, a coating composition for ferrous metal surfaces consists essentially of a bonding solution neutralized by an oxidation-reduction reaction, and finely divided aluminum particles.

The bonding solution component of the coating embodying the present invention requires that it contain sufficient aluminum in solution so that it is substantially equilibrated with respect to aluminum, i.e., that the amount of aluminum in solution be substantially at the saturation point and the bonding solution therefore essentially inert with respect to any subsequent additions of aluminum. Aluminum powder (Al), alumina ($Al_2O_3$) or aluminum hydroxide ($Al[OH]_3$) may be used to provide equilibration of the bonding solution. If alumina or aluminum hydroxide are selected, it is desirable to heat the mixture to increase the reaction rate. Magnesium, while not essential, may desirably be used to at least partially neutralize, i.e., reduce the acidity, of the aqueous phosphoric acid mixture either before or after equilibration of the mixture with aluminum. It has also been found that the addition of a relatively small, but essential, amount of vanadium pentoxide ($V_2O_5$) to the bonding solution significantly enhances the oxidation and corrosion resistance properties of the coating following exposure to a high temperature environment, such as that found in the compressor section of a gas turbine engine during operation of the engine.

Preferably, the bonding solution includes either magnesium carbonate ($MgCO_3$) or magnesium oxide (MgO), and has a composition consisting essentially of, by weight, from about 47% to about 80% $H_2O$ from about 15% to about 35% $H_3PO_4$, less than about 20% of either $MgCO_3$ or MgO, 0.1% to about 3.0% $V_2O_5$, and from about 0.1% to about 3.5% aluminum in solution. If magnesium, either as a carbonate or oxide, is not used as an aid to neutralization of the bonding solution, aluminum in amounts represented by the upper limits of the above stated ranges will be required to sufficiently neutralize the phosphoric acid solution and also equilibrate the solution with respect to aluminum. As used herein, the formula "$H_3PO_4$" to is used with reference to absolute, or 100% pure, full strength phosphoric acid; the term "phosphoric acid" means the 75% (industrial) strength phosphoric acid that is commonly commercially available; and the term "phosphoric acid solution" is used to identify a water-diluted solution of phosphoric acid.

When $MgCO_3$ is used as a partial neutralizing agent, the bonding solution desirably has a composition consisting essentially of, by weight, from about 47% to about 67% $H_2O$, from about 27% to about 35% $H_3PO_4$, no more than about 20% $MgCO_3$, from about 0.1% to about 3.0% $V_2O_5$, and from about 0.1% to about 3.5% aluminum in solution. Preferably, the magnesium carbonate neutralized bonding solution consists essentially of, by weight, about 62% $H_2O$, about 27% $H_3PO_4$, about 9% $MgCO_3$, about 1.7% $V_2O_5$, about 2% Al(OH)$_3$ and about 0.2% aluminum powder.

When, MgO is used as a partial neutralizing agent, the composition desirably consists essentially of, by weight, from 52% to about 80% $H_2O$, from about 15% to about 35% $H_3PO_4$, no more than about 10% MgO, from about 0.1% to about 3.0% $V_2O_5$, and from about 0.1 to about 3.5% aluminum in solution. Preferably, the bonding solution partially neutralized with MgO consists essentially of, by weight, about 65% $H_2O$, about 25% $H_3PO_4$, about 4% MgO, about 1.7% $V_2O_5$, about 3.4% Al(OH)$_3$ and about 0.3% aluminum powder.

In accordance with the present invention, the bonding solution component is formed by diluting $H_3PO_4$ with water, in a ratio in parts by weight, of from about 500 to 900 parts water to 147 parts $H_3PO_4$. In the preferred embodiment of the present invention, the above proportions are met by mixing 196 parts of 75% industrial grade phosphoric acid with 650 parts water.

After mixing, the diluted phosphoric acid solution is heated to its boiling point, and aluminum then added in an amount sufficient to substantially equilibrate the solution with respect to aluminum. Only a relatively small amount of elemental aluminum such as powdered aluminum or aluminum strips, for example from about 10 to about 70 parts by weight, is required for this purpose. If an aluminum compound, such as alumina or aluminum hydroxide is selected to provide solute aluminum in the mixture, amounts of such compounds should be added to provide from about 0.1% to about 3.5% aluminum in solution.

In the preferred embodiment, about 10-40 parts by weight, preferably about 20 parts by weight, of aluminum hydroxide is slowly added to the boiling phosphoric acid solution, boiled together for a period of time, typically 3 to 10 minutes, sufficient to dissolve the Al(OH)$_3$, and then removed from the heat source.

After the addition of aluminum, either magnesium carbonate, magnesium oxide, or mixture thereof is desirably added, in addition to an essential amount of vanadium pentoxide, to the aluminum-equilibrated mixture. If magnesium carbonate is selected, less than 120 parts, by weight, and preferably about 50 parts, are added to the mixture. If magnesium oxide (magnesia) is selected, less than 50 parts, by weight, and preferably about 24 parts, are added. In the present invention, vanadium pentoxide in a amount of from about 1 to about 30 parts, by weight, and preferably about 10 parts, is added to the mixture.

The optional magnesium compounds and the required vanadium pentoxide additions are preferably mixed into the aluminum equilibrated solution in the following order. A portion of the magnesium (for example about 40%) is slowly added while stirring to the hot, but not boiling, equilibrated solution. This mixture is stirred until the added magnesium compound is completely dissolved, for example about 10 minutes. The solution is then again heated to boiling and the vanadium pentoxide is slowly added while stirring. Heating and stirring are continued, typically for at least 10 minutes, until the solution is free of undissolved solids. The solution is then again removed from the heat source and the remaining MgO is slowly added while continuously stirring. When the solids are completely dissolved, or the solution shows only trace amounts of solids, the solution should again be heated to boiling for 1 minute and then removed from the heat source.

It is desirable to add a small amount, for example about 2 parts by weight, of aluminum to the hot solution to assure complete equilibration of the mixture with respect to aluminum. A fine aluminum powder, such as Alcoa Type 201, is suitable for this purpose, and should be stirred into the solution for about one minute.

The solution should then be cooled to about 60° F.-80° F. (15° C.-17° C.) and measurements made of pH and density. Preferably, pH should be between 2.8 and 3.4 and density should be between 1.28 and 1.32 g/ml. Control of pH will maximize the shelf life of the subsequently formed slurry and minimize reaction of the coating with carbon steel substrates. If the pH is lower than 2.8, additional magnesium (either oxide or carbonate) should be added to reduce the acidity of the mixture and bring it into the desired range. Generally this will require the addition of less than 3 g of MgO. The solution should be stirred for a least 5 minutes after the last addition.

Ideally, the solution is initially made to the desired density. However, due to the boiling required in the introduction of the aluminum hydroxide and the vanadium pentoxide, significant water is lost in solution preparation. Also, the type and size of mixing container and the heat source will effect the amount of water remaining in the solution. Therefore, it may be necessary to adjust the density of the bonding solution if it is outside the desired range of 1.28 to 1.32 g/ml. Preferably, a higher or lower density modifying solution is prepared by adding less or more water in the initial preparation stage. The modifying solution is then added to adjust the density of the bonding solution to the desired range. Alternatively, a low density solution can be boiled to drive off water and achieve the desired density. However, a high density solution must be diluted by the addition of a low density modifying solution because direct addition of water to the bonding solution will cause precipitation.

After assurance that the pH and density of the solution are within the desired limits, the solution should be allowed to settle for 24 hours and filtered before using.

The slurry coating embodying the present invention is formed by mixing the above described equilibrated bonding solution with very fine atomized aluminum powder, desirably having a nominal particle size of no more than about 45 μm and preferably a mean particle size of about 3 μm to 8 μm. The aluminum powder is added to the bonding solution in amounts to provide a ratio of from about 50 g to about 150 g of the aluminum powder for each 100 ml of the bonding solution. Preferably, the slurry contains about 100 g of atomized aluminum powder, such as Reynolds 400 aluminum powder, for each 100 ml of above described bonding solution. The aluminum powder should be sifted through one or more sieves to assure that there are no agglomerates prior to mixing into the bonding solution. If the coating is to be used in applications that require a very smooth surface, such as on gas turbine compressor blades, the atomized aluminum powder should be screened through a 400 mesh sieve.

The slurry formed as described above is typically applied to a metallic surface prone to oxidation or corrosion, by dipping or spraying, with spraying being the preferred process. A protective coating for the metallic surface is preferably formed by applying the slurry in two coats, each about 0.001 inch (0.025 mm) in thickness, dried at 140° F.–180° F. (60° C.–82° C.) for 30 to 60 minutes and cured at about 650° F. (343° C.) for 30 to 60 minutes between each coat. The coatings, as cured, are not electrically conductive and therefore cannot provide galvanic protection against corrosion of the underlying substrate material. However, the coatings can be made electrically conductive by bead peening or by heating as specified in MIL-C-8175B specification. Thus, the coatings can, by mechanical or thermal processes, be made electrically conductive and thereby provide galvanic as well as barrier protection of the underlying ferrous alloy metal substrate.

Desirably, after the second coating is applied, dried, cured and processed to make it electrically conductive, the surface of the coating is sealed. It has been found that the above described bonding solution is useful, by itself, when applied as a seal coat to seal the surface of the dried and cured slurry coats. The bonding solution seal coat seals any undesirable porosity in the earlier applied coating and provides additional oxidation and corrosion protection of the substrate. Further, the bonding solution provides a smooth surface that enhances the flow characteristics of aerodynamic components onto which it is applied. Also, the rate of consumption of aluminum in the coating during service is decreased. The seal coats are dried and cured at the same time and temperature as the above described slurry coatings.

The bonding solution, as described above, may also be used to form a slurry mixture with other particulate materials, such as insoluble solid metal oxides, nitrides or carbides, solid lubricants or abrasive particles. Examples of such materials, which should desirably be essentially inert, or nonreactive, with the bonding solution, include iron oxide, aluminum oxide, boron nitride, silicon nitride and graphite.

Industrial Applicability

The chrome and molybdenum-free coatings embodying the present invention are particularly useful for providing corrosion and oxidation protection to ferrous metal alloy surfaces operating at elevated service temperatures, such as the compressor blades, stators, and casings of gas turbine engines.

A number of test specimens were prepared to compare the coating embodying the present invention with current commercially available and accepted coatings, all of which undesirably contain chromium or molybdenum. The test specimens were inspected for surface appearance and roughness, and tested for conductivity, mechanical properties including resistance to spalling and bond strength, thermal stability, resistance to corrosion, and resistance to corrosion at elevated temperatures. The coatings embodying the present invention were found to be at least equal to, and in many instances superior to, the coatings containing chromates or molybdates. In particular, the coatings containing vanadium pentoxide in the bonding solution were stable at high temperature and exhibited significantly greater resistance to oxidation and corrosion after exposure to elevated temperatures than coatings without the vanadium pentoxide addition and prior art coatings containing chromium or molybdenum. Also, it was observed that the test specimens coated with the slurry composition embodying the present invention were very smooth, having a surface roughness better than, or at least equal to, the best coatings containing chromium or molybdenum.

While the invention has been described with reference to certain preferred embodiments, those skilled in the art recognize that certain common substitutions may be made without altering the essential properties of the claimed coating composition. For example, while water is specified in the above examples illustrating the preferred embodiment, other common solvents such as alcohol, acetone, or similar liquids, may be substituted for a portion of the water in the claimed mixtures without departing from the spirit of the invention.

Other aspects, objects and advantages of this invention can be obtained from a study of the disclosure and the appended claims.

What we claim is:

1. A coating composition comprising a slurry mixture of a bonding solution and aluminum powder in ratio of about 100 ml of the bonding solution to from about 50 g to about 150 g of the aluminum powder, said bonding solution consisting essentially of, by weight, from about 47% to about 80% $H_2O$, from about 15% to about 35% $H_3PO_4$, less than about 20% of at least one magnesium compound selected from the group consisting of MgCO and MgO, from about 0.1% to about 3.0% $V_2O_5$, and aluminum in an amount sufficient to substantially equilibrate said bonding solution with respect to aluminum.

2. The coating composition, as set forth in claim 1, wherein said bonding solution consists essentially of, by weight, about 65% $H_2O$, about 25% $H_3PO_4$, about 4% MgO, about 1.7% $V_2O_5$, and from about 0.1% to about 3.5% aluminum in solution.

3. The coating composition, as set forth in claim 1, wherein the ratio of the aluminum powder component of the slurry mixture is about 100 g to each 100 ml of the bonding solution.

4. The coating composition, as set forth in claim 1, wherein said aluminum powder component of the slurry mixture is an atomized aluminum powder having a mean particle size of less than about 45 μm.

5. A bonding solution for mixing with a particulate material to form a slurry mixture useable as a coating, said bonding solution consisting essentially of, by weight, from about 47% to about 80% $H_2O$, from about 15% to about 35% $H_3PO_4$, less than about 20% of at least one magnesium compound selected from the group consisting of $MgCO_3$ and MgO, from about 0.1% to about 3.0% $V_2O_5$, and aluminum in an amount sufficient to substantially equilibrate said bonding solution with respect to aluminum.

6. The bonding solution, as set forth in claim 5, wherein said bonding solution consists essentially of, by weight, about 65% $H_2O$, about 25% $H_3PO_4$, about 4% MgO, about 1.7% $V_2O_5$, and from about 0.1% to about 3.5% aluminum in solution.

7. A seal coating composition consisting essentially of, by weight, from about 47% to about 80% $H_2O$, from about 15% to about 35% $H_3PO_4$, less than about 20% of at least one magnesium compound selected from the group consisting of $MgCO_3$ and MgO, from about 0.1% to about 3.0% $V_2O_5$, and aluminum in an amount sufficient to substantially equilibrate said bonding solution with respect to aluminum.

8. A seal coating composition, as set forth in claim 7, wherein said seal coating composition consists essentially of, by weight, about 65% $H_2O$, about 25% $H_3PO_4$, about 4% MgO, about 1.7% $V_2O_5$, and from about 0.1% to about 3.5% aluminum in solution.

9. A method of forming a slurry coating composition, comprising the steps of:

mixing together from about 500 to about 900 parts by weight of water and 147 parts by weight H₃PO₄ and forming a dilute phosphoric acid solution;

adding an aluminum, containing material, selected from the group consisting of metallic aluminum powder, aluminum oxide and aluminum hydroxide, in an amount sufficient to substantially equilibrate said dilute phosphoric acid solution with respect to aluminum;

adding from 0 about 120 parts by weight of at least one magnesium compound selected from the group consisting of magnesium carbonate and magnesium oxide;

adding from about 1 to about 30 parts by weight of vanadium pentoxide to form a mixture;

stirring said mixture for a period of time sufficient to permit the substantially complete reaction of said added compounds with phosphoric acid and forming a neutralized solution that is substantially equilibrated with respect to aluminum;

mixing said neutralized solution with atomized aluminum powder in an amount sufficient to form a slurry containing from about 50 g to about 150% of aluminum powder for each 100 ml of the neutralized bonding solution.

10. A method of forming a slurry coating, as set forth in claim 9, wherein the amount of said magnesium compound is selected to produce a neutralized bonding solution having a pH of from about 2.8 to about 3.4.

11. A method of forming a slurry coating, as set forth in claim 9, wherein the amount of said water is selected to produce a neutralized bonding solution having a density of from about 1.28 to 1.32 g/ml.

12. A method of forming a slurry coating, as set forth in claim 9, wherein said aluminum compound added to said mixture consists of adding from about 10 to about 40 parts by weight aluminum hydroxide.

13. A method of forming a slurry coating, as set forth in claim 9, wherein said atomized aluminum powder mixed with said neutralized bonding solution has a mean particle size of less than about 45 μm.

14. A method of forming a slurry coating, as set forth in claim 9, wherein the step of adding at least one magnesium compound to said mixture consists of adding less than about 50 parts by weight of magnesium oxide.

15. A method of forming a slurry coating, as set forth in claim 9, wherein said aluminum powder is mixed with said neutralized bonding solution in an amount sufficient to form a slurry containing about 100 g of aluminum powder for each 100 ml of said neutralized bonding solution.

* * * * *

UNITED STATES PATENT AND TRADEMARK OFFICE
CERTIFICATE OF CORRECTION

PATENT NO. : 5,279,649

DATED : January 18, 1994

INVENTOR(S) : Alvin R. Stetson et al.

It is certified that error appears in the above-identified patent and that said Letters Patent is hereby corrected as shown below:

Claim 1, column 6, line 22, delete "MgCO" and insert --$MgCO_3$--.

Claim 9, column 7, line 4, after "aluminum", delete ",".

Claim 9, column 7, line 21, after "neutralized" insert --bonding--.

Claim 9, column 7, line 23, delete "150%" and insert --150g--.

Signed and Sealed this

Fourteenth Day of June, 1994

*Attest:*

BRUCE LEHMAN

*Attesting Officer*     *Commissioner of Patents and Trademarks*